J. P. GERHART.
AUTOMOBILE HOOD ATTACHMENT.
APPLICATION FILED FEB. 26, 1919. RENEWED NOV. 5, 1920.
1,368,923.
Patented Feb. 15, 1921.
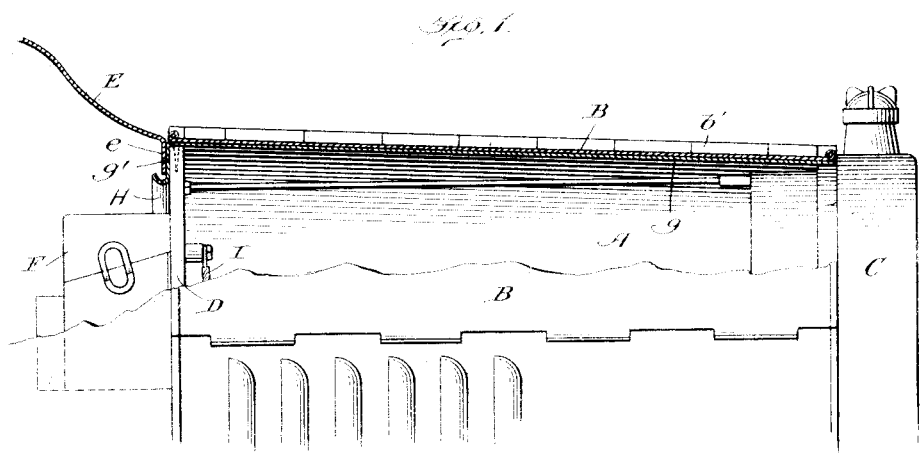
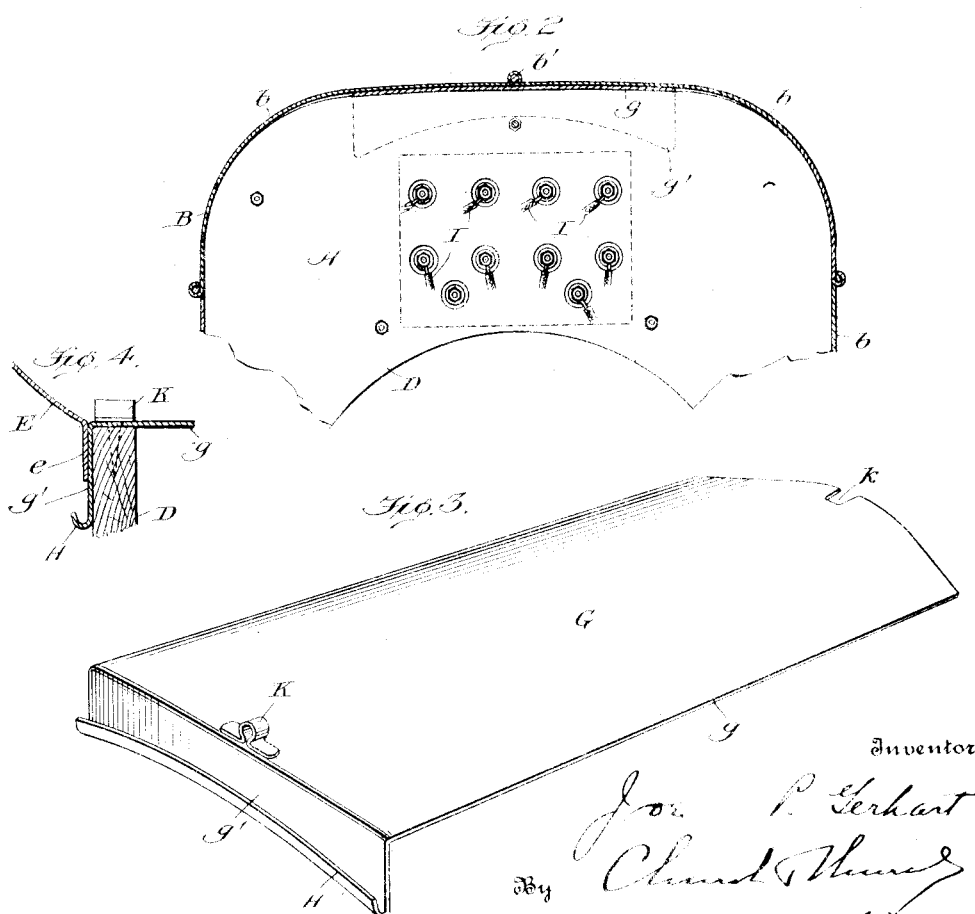

UNITED STATES PATENT OFFICE.

JOE P. GERHART, OF SEALY, TEXAS.

AUTOMOBILE-HOOD ATTACHMENT.

1,368,923. Specification of Letters Patent. Patented Feb. 15, 1921.

Application filed February 26, 1919, Serial No. 279,349. Renewed November 5, 1920. Serial No. 422,076.

*To all whom it may concern:*

Be it known that I, JOE P. GERHART, a citizen of the United States, residing at Sealy, in the county of Austin, State of Texas, have invented certain new and useful Improvements in Automobile-Hood Attachments; and I do hereby declare the following to be a full, clear, and exact description of the same, when taken in connection with the accompanying drawings, forming part of this specification.

In automobiles of today, and particularly those of the Ford type, a great deal of trouble is experienced in inclement weather due to the fact that a large proportion of water deposited on the cowl in front of the windshield drains toward the front edge of the cowl, where it usually drops down onto the coil box mounted on the rear side of the dashboard, or else passes over the top of the dashboard and runs down on the electrical connections leading into the engine compartment from the front side of the dashboard. Trouble is also had on account of water coming through the hinge joints of the hood sections and dripping down on the electrical connections in the engine compartment.

With the elimination of these objectionable features as its primary object, the present invention consists essentially in the provision of an attachment for the automobile hood that is so constructed that there will be no joints through which water draining off the cowl can pass and drop onto the coil box, and is so positioned with respect to the cowl that water from the latter will be collected in a trough immediately below the same and diverted to points beyond the opposite sides of the coil box. The construction of this attachment is also such that any water coming through the upper hinge joint of the hood proper will be carried off to opposite sides of the engine compartment and will thus be prevented from coming in contact with the various electrical connections in said compartment.

In the accompanying drawings:

Figure 1 is a longitudinal sectional view of the forward portion of an automobile, showing the attachment comprising the present invention secured in place within the hood;

Fig. 2 is a transverse section of the hood showing my attachment applied thereto;

Fig. 3 is a perspective view of my attachment;

Fig. 4 is a detail sectional view of the automobile cowl and the adjacent portion of my attachment.

Like letters of reference indicate the same parts in the several views.

As shown in Figs. 1 and 2, the engine compartment A is formed by the hood B of the usual type, consisting of a plurality of hinged sections $b$, the forward end of the hood B being supported on the inner portion of the radiator C and its rear end on the dashboard D. The cowl E of the automobile body extends forwardly and downwardly in proximity to the rear end of the hood B, its front edge portion being formed into a depending flange $e$ that extends downwardly adjacent the rear face of dashboard D. As it is impracticable to make a water tight joint at the adjacent faces of the flange $e$, rear end of hood B, and the dashboard D, the space between these members permits any water draining forwardly off the cowl E to pass through and drop down on the coil box F mounted on the rear of the dashboard. It is, therefore, necessary to provide means beneath the cowl to collect the water that comes through and divert it away from the coil box and electrical connections.

To effectually accomplish this, and to deflect any water that may come through the hinge joint $b'$ of the hood B, there is provided, in accordance with the present invention, an auxiliary hood G preferably formed from a single sheet of metal and of a width substantially equal to that of the upper portion of the engine compartment. The body portion $g$ of the auxiliary hood G is supported at one end upon the radiator and the other end extends back to the rear face of the dashboard D, at which point it is turned downwardly to form a depending flange $g'$ adapted to lie flat against the rear face of the dashboard and between the latter and the flange $e'$ of the cowl. The auxiliary hood G terminates in front of the cowl and is supported in its proper position independently of the cowl, the rear end of its body portion $g$ being secured to the dashboard in any desired manner. At its lower edge the flange $g'$ is turned outwardly and upwardly away from the dashboard D to form a trough H, the opposite ends of which are inclined away from the center of the dashboard and extend to points beyond the sides of the coil box F.

When the attachment is in place, (Fig. 1) the flange $g'$ fits between the dashboard D and flange $e$ of the cowl so that trough H is positioned in vertical alinement and below the cowl flange. With this arrangement it is unnecessary to attach the auxiliary hood to the cowl, thus eliminating the formation of a joint between those two parts through which water could seep and drop down on the coil box, on the other hand there is only one passage the water draining off the cowl can take and possibly reach the coil box F—that is between the flanges $e$ and $g'$ of the cowl and auxiliary hood, respectively—but any water coming through this opening will be caught in the trough H and carried off beyond the opposite sides of the coil box. If, however, any water should pass off the cowl and under the hood B, the body portion $g$ of the auxiliary hood G will carry it off toward the sides of the engine compartment and thus prevent it coming in contact with the electrical connections I leading from the coil box F out through the front face of the dashboard. The body portion $g$ of the auxiliary hood will, in the same manner, divert any water that may come into the engine compartment through the hinge joint $b'$ of the hood B.

To prevent lateral displacement of the auxiliary hood it is provided with a keeper K at its rear end adapted to receive the hinge rod of the joint $b'$ of the main hood.

While the auxiliary hood is shown and described as being made of a single sheet of material it need not necessarily take this form but may be made sectional, it only being essential that no joints be made through which water can reach the coil box or longitudinal central portion of the engine compartment.

What I claim is:

1. In an automobile, the combination with the cowl, dashboard, coil box, radiator and hood, of an auxiliary hood having a body portion supported at its front and rear ends on the radiator and dashboard, respectively, a depending flange at the rear end of the body portion projecting downwardly in rear of the dashboard and between the latter and the cowl, and a trough formed on the lower edge of said flange and located in position to collect all water dropping off the cowl in rear of the dashboard, said trough extending beyond the sides of the coil box and having its opposite ends bent downwardly, whereby water draining off the cowl will be conveyed to opposite sides of said box.

2. In an automobile, the combination with the cowl, said cowl having a depending flange, of an auxiliary hood located within the engine compartment hood for protecting the coil box from water draining off the cowl, said hood being supported on and covering the top of the dashboard of the automobile and positioned against the cowl flange and said hood being entirely detached from the cowl, and a trough formed on the hood and positioned above the coil box to collect any water draining off the cowl between the cowl flange and auxiliary hood.

3. In an automobile, the combination with the dashboard and the cowl having a depending flange at its front edge, of a hood attachment supported in position independently of the cowl, comprising a body portion extending forwardly over the dashboard and engine compartment, a flange of greater depth than the cowl flange projecting downwardly from the body portion and positioned adjacent the cowl flange, the only joint between the attachment and cowl being formed by the said two flanges, and a trough at the lower edge of the hood attachment flange positioned immediately below the joint formed by the flanges on the cowl and attachment.

4. In an automobile, the combination with the dashboard and cowl, of an auxiliary hood positioned beneath the engine compartment hood and extending over the top of the dashboard for protecting the coil box from water draining off the cowl, said hood being supported in position independently of the cowl, there being a single joint between said cowl and hood, and a trough located above the coil box and positioned to collect any water draining off the cowl through the joint between the cowl and hood.

JOE P. GERHART.